United States Patent [19]

Heitschel et al.

[11] Patent Number: 4,988,992

[45] Date of Patent: Jan. 29, 1991

[54] SYSTEM FOR ESTABLISHING A CODE AND CONTROLLING OPERATION OF EQUIPMENT

[75] Inventors: Carl T. Heitschel, Downers Grove; Paul W. Reich, Glendale Heights, both of Ill.

[73] Assignee: The Chamberlain Group, Inc., Elmhurst, Conn.

[21] Appl. No.: 386,367

[22] Filed: Jul. 27, 1989

[51] Int. Cl.[5] .................... H04B 7/00; H04B 10/00

[52] U.S. Cl. .................... 340/825.69; 340/825.31; 341/176

[58] Field of Search .................... 340/825.22, 825.31, 340/825.34, 825.69, 825.63, 825.72; 358/194.1; 375/22; 455/352, 603; 341/176

[56] References Cited

U.S. PATENT DOCUMENTS

| | | | |
|---|---|---|---|
| Re. 29,525 | 1/1978 | Willmott | 340/825.63 |
| 4,178,549 | 12/1979 | Ledenbach et al. | 375/22 |
| 4,509,093 | 4/1985 | Stellberger | 340/825.31 |
| 4,529,980 | 7/1985 | Liotine et al. | 340/825.52 |
| 4,535,333 | 8/1985 | Twardowski | 340/825.31 |
| 4,550,311 | 10/1985 | Galloway et al. | 340/825.31 |
| 4,596,985 | 6/1986 | Bongard et al. | 340/825.31 |
| 4,652,860 | 3/1987 | Weishaupt et al. | 340/825.69 |
| 4,750,118 | 6/1988 | Heitschel et al. | 364/400 |
| 4,758,835 | 6/1988 | Rathmann et al. | 340/825.72 |
| 4,866,434 | 9/1989 | Keenan | 340/825.72 |
| 4,912,463 | 3/1990 | Li | 341/176 |

*Primary Examiner*—Donald J. Yusko
*Assistant Examiner*—Dervis Magistre
*Attorney, Agent, or Firm*—Fitch, Even, Tabin & Flannery

[57] ABSTRACT

A system for establishing a code and controlling operation of equipment. This system includes a first transmitter including a random code generator and a memory for storing the randomly generated code, as well as a transmitter for providing a radio frequency signal carrying that code. The system furthermore includes a transceiver including a receiver for the siganl generated by the first transmitter and a memory for storing the code carried by that signal. The transceiver includes a second transmitter for transmitting a radio frequency signal carrying the code. This system also includes a remote receiver unit for connection to the equipment to be controlled. This remote receiver unit has a receiver for the radio frequency signal transmitted by either the first transmitter or the transceiver and a memory for storing that random code carried by the signal. The remote receiver also includes a comparator for comparing a code carried by a radio frequency signal with the code stored in the memory of the remote reciever unit. The remote receiver unit also includes an actuator for causing operation of the equipment if the receiver code matches the stored code. A method of using the system is also disclosed.

3 Claims, 3 Drawing Sheets

SYSTEM FOR ESTABLISHING A CODE AND CONTROLLING OPERATION OF EQUIPMENT

This invention relates to controlling operation of equipment, such as a garage door opener, and more particularly, to a system including transceivers which establish a random code, memorize the code, and control operation of the equipment by transmitting a radio frequency signal carrying the code.

BACKGROUND OF THE INVENTION

Home convenience and protection equipment such as garage door operators, lighting systems and security systems are coming to be viewed as necessities and not merely luxuries. These systems are often controlled by transmitters providing a radio frequency signal carrying a code. For security, the code must be kept secret and must be one of a large number of possible codes. But for convenience, the transmitters and receivers they control should be simple to program with the code.

Various controller systems have been proposed and/or manufactured using digital radio control and digital system processing, and allowing codes to be established by the user or randomly generated. In one system, a unique code is established at the transmitter using a number of two-position switches The remote receiver also has a like number of switches to set the established code. For further information on the structure and operation of such a system, reference may be made to U.S. Pat. No. 29,525 to Willmott. In U.S Pat. No. 4,178,549 to Ledenbach et al., the receiver recognizes a received signal from being from a particular transmitter by measuring and comparing relative durations of the pulse and non-pulse time intervals.

Other systems have been proposed which do not require the user to set the code by operating switches on the transmitter and receiver. In one system, a random code generator at the receiver establishes the code. The new code is placed in the memory of a transmitter by holding the transmitter in proximity to the receiver which flashes the established code by means of a light emitting diode to a phototransistor in the transmitter. In another system, each transmitter has its own unique code. The receiver can learn up to five unique codes. Should a transmitter be lost or stolen, the code for that transmitter can easily be removed from the memory of the receiver. For further information concerning the structure and operation of such systems, reference may be made to U.S. Pat. Nos. 4,529,980 to Liotine et al., and 4,750,118 to Heitschel et al., respectively.

SUMMARY OF THE INVENTION

Among the several aspects and features of the present invention may be noted the provision of an improved system for establishing a code and controlling operation of equipment, such as a garage door opener. In this system, a transmitter randomly establishes a code which can be placed in the memory of a transceiver and a receiver for operating the equipment. Thus after set up, either the transmitter or the transceiver can generate a radio frequency signal carrying the code to operate the equipment. Furthermore, the transmitter can randomly generate a second code which can be placed in the memory of the transceiver and in the memory of a second receiver for other equipment, such as a home security system, so that either the transmitter or the transceiver can operate either receiver The operation codes can easily be changed should either the transmitter or the transceiver be lost. The system of the present invention has long service life, is reliable in use, and is relatively easy and economical to manufacture. Other aspects and features of the present invention will be, in part, apparent and, in part, specifically pointed out in the following specification and the accompanying drawings.

Briefly, a transmitter has a program switch so as to allow a random number generator to produce a random code which is supplied to and stored in an electronic memory. The transmitter can then broadcast the set code to a transceiver or a remote receiver.

A transceiver is provided with a receiver and an antenna for receiving the signal from the aforementioned transmitter during learning mode operation. The transceiver supplies the received signal to an electronic memory wherein the received code is stored. Then, the transmitter portion of the transceiver may be utilized to transmit the code received from the transmitter to a remote receiver.

The transceiver or the first transmitter can then activate auxiliary equipment which is connected to one or more remote receivers. An electronic memory within the remote receiver stores the received code which was established by the first transmitter and transmitted by either the transceiver or the transmitter. In its activate mode, the remote receiver compares the code carried by a radio frequency signal with the code stored in electronic memory. If the codes match, the remote receiver will activate control equipment, such as a security system or a garage door opener.

BRIEF DESCRIPTION OF THE DRAWINGS

Corresponding reference characters indicate corresponding components throughout the several views of the drawings.

DESCRIPTION OF THE PREFERRED EMBODIMENT

Figure 1:
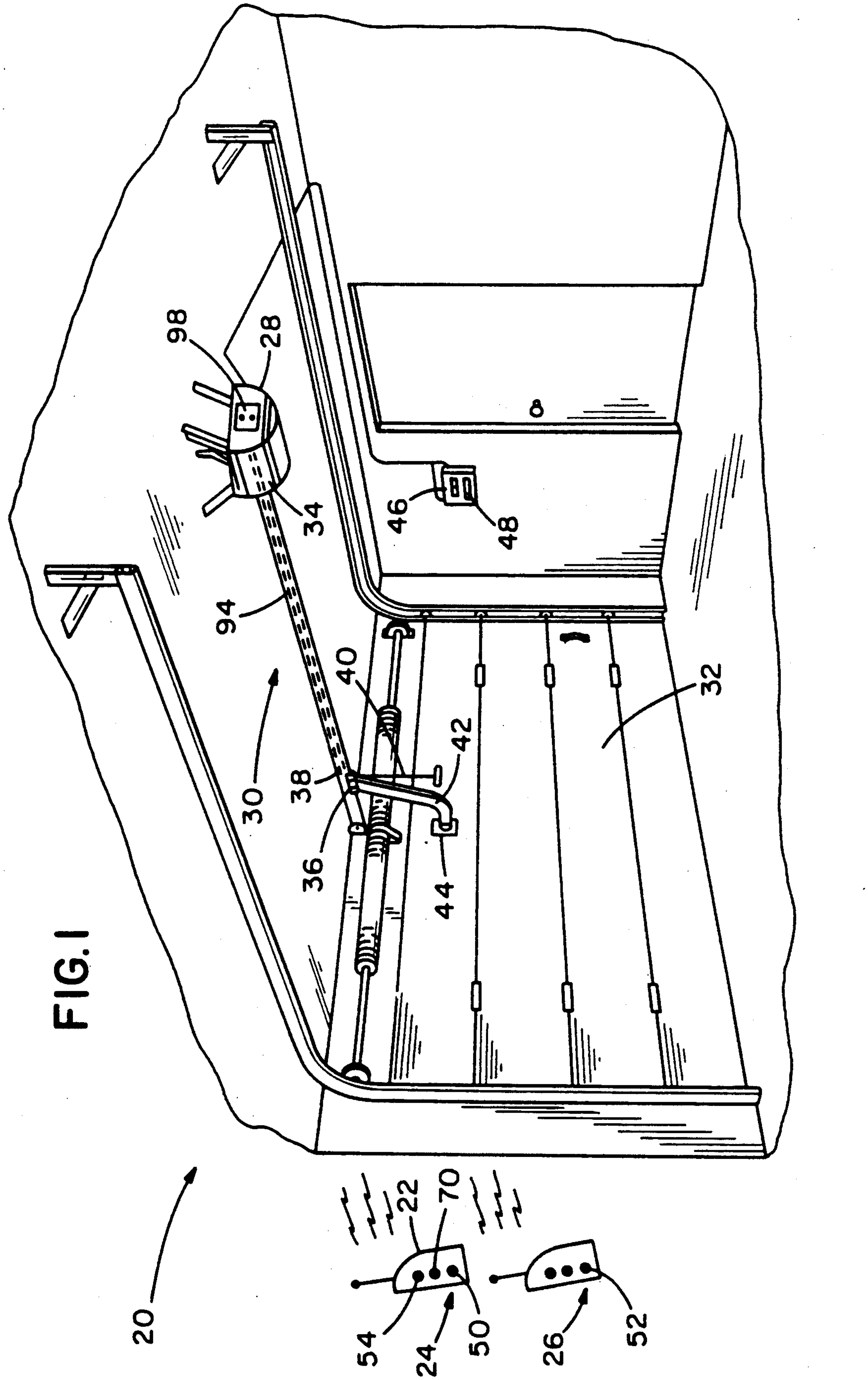
FIG. 1 is a perspective view of a system embodying various aspects of the present invention connected to control operation of a garage door.

Referring now the drawings, a system for establishing a code and controlling operation of equipment, such as a garage door operator, is generally indicated by reference numeral 20 in FIG. 1. The system 20 includes a transmitter 22 having a random code generator and which can be included in a first transceiver 24, a second transceiver 26 which is preferably identical to the first transceiver 24, and a receiver 28 for positioning remote from the transceivers 24 and 26 and responsive to actuation of either transceiver to cause operation of the equipment. The second transceiver 26 receives a radio frequency signal generated by the first transceiver, and has a memory for storing that code. The receiver 28 also receives the radio frequency signals transmitted by either transceiver and has a memory for storing the code. An example of such a receiver is shown and described in U.S. Pat. No. 4,750,118, the teachings of which are incorporated herein by reference.

The system 20 can be used to control operation of a garage door operator 30 shown in FIG. 1 mounted to the ceiling of a garage and connected to operate a garage door 32. Garage door operator 30 has a head unit 34, supported from the ceiling, and including a motor which drives a suitable chain 94 to which a trolley 36 is attached so that it moves along a rail 38. The trolley 36 has a release cord 40 and pivotally carries a lever arm 42 which is attached to a bracket 44 mounted to the door 32 so, as to raise and open the door by pulling the trolley 36 along the rail 38.

The head unit 34 includes the remote receiver 28 and an operating mechanism. Head unit 34 can be actuated from an auxiliary control unit 46 which has an operate switch 48. The garage door operator 30 can also be operated by the transceiver 24 or the transceiver 26 which have transmit buttons 50 and 52 respectively.

Figure 2:
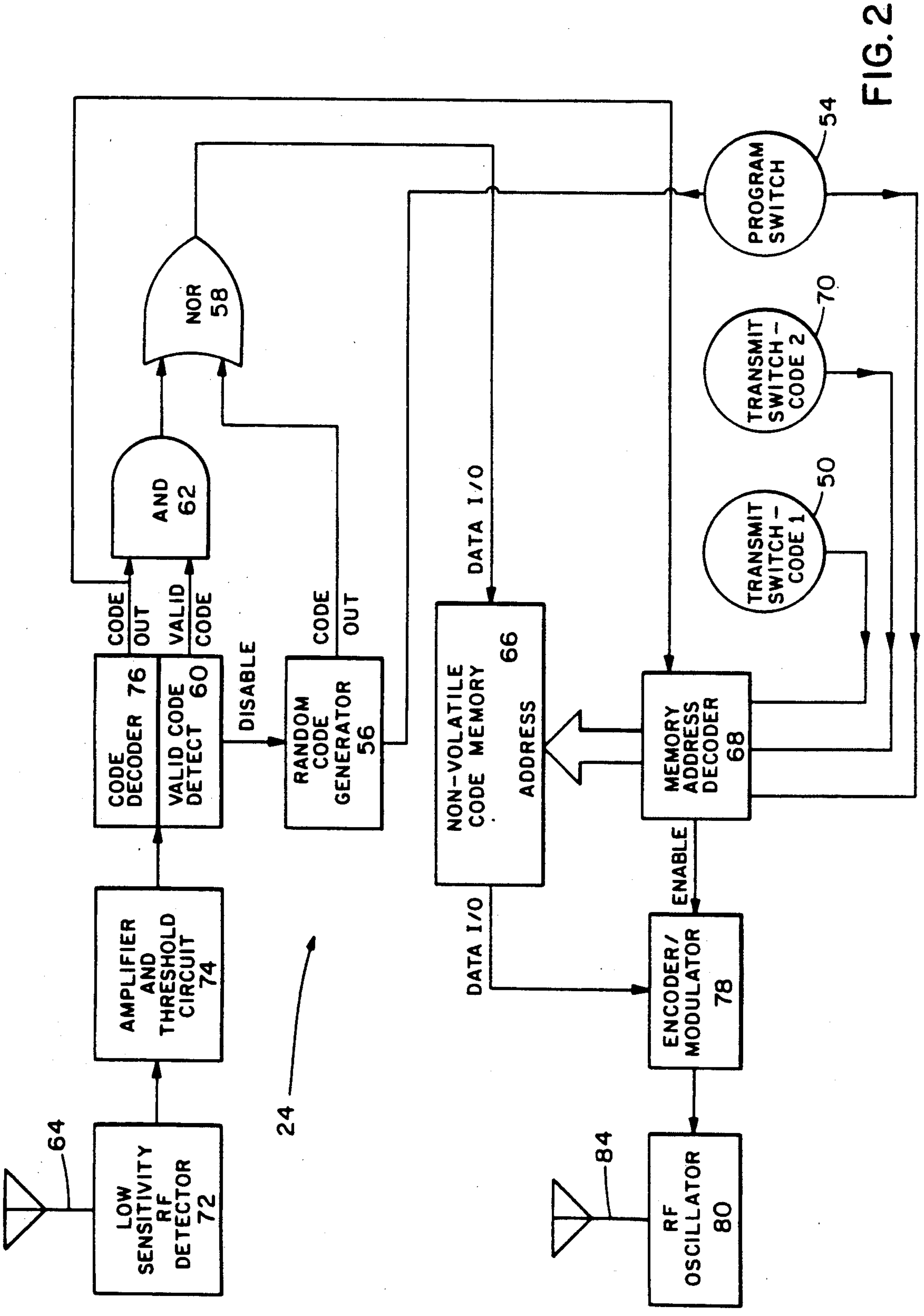
FIG. 2 is a block diagram showing the electrical and electronic components of a transceiver used in the system of FIG. 1.

As the transceivers 24 and 26 are preferably identical, only the transceiver 24 need be described in detail. Referring to FIG. 2, the transceiver 24 can be operated in one of three modes—a programming mode, a learning mode, and an activation mode. The programming mode is used to establish and store at least one random code in non-volatile code memory. The learning mode permits the transceiver 24 to copy, or "learn", one or more random codes from another transceiver or from a transmitter. After the transceiver 24 has stored one or more codes in memory, the transceiver can be used in its activation mode to transmit the stored code to the remote receiver 28.

The transceiver 24 of FIG. 2 is initially programmed for use in either the programming mode or the learning mode. To enter the programming mode, the programming switch 54 is depressed, energizing a random code generator 56. The random code generator 56 provides, for example, a random binary code which is fed to one input of a NOR gate 58. The other input of the NOR gate is connected to valid code detector 60 through an AND gate 62. Provided that no input signal containing a valid code is present at input antenna 64, the valid code detector output is low. Thus, the random code will pass through the NOR gate 58 to a non-volatile code memory 66. The code memory 66 stores the random code in an area of memory reserved for code number one. As the transceiver 24 is adapted to establish and store more than one code, it is necessary to operate the first code transmit switch 50 at the same time that program switch 54 is actuated. Transmit switch 50, which is connected to the memory 66 through a memory address decoder 68, functions to select the portion of the memory for storage of the first code. The transceiver 24 also has a second transmit switch 70. Concurrent actuation of the program switch 54 and the second transmit switch, with no radio frequency signal bearing a valid code being received by antenna 64, results in a second code (which can be transmitted to a second receiver for operation of other equipment, such as a security system) being established by the random code generator 56 and stored in a second area of the memory 66.

In the learning mode, the transceiver 24 of FIG. 2 can be used to receive and store random codes sent from other transmitters and transceivers. As with the programming mode, the learning mode may be entered by depressing the program switch 54 and selecting the area of the memory in which the new code is to be stored by actuating either of the transmit switches 50 or 70. A signal carrying a valid code, which may be transmitted by transceiver 26 disposed in close proximity to transceiver 24, is received by an antenna 64 and fed to a low-sensitivity RF detector 72. Due to the low sensitivity of RF detector 72, the antenna 64 must be placed within about 2 or 3 inches of a companion transmitter. The demand for such close proximity prevents unauthorized copying of the random codes. From the output of RF detector 72, the signal is amplified by an amplifier/threshold circuit 74. The threshold circuit only passes signals above a predetermined strength, thus eliminating possible interference or false signaling due to environmental noise. A code decoder 76 demodulates the code carried by the input signal. The code is sent to the valid code detector 60 which distinguishes codes conforming to a system protocol from codes originating at unrelated systems.

A valid code detector and the procedure for entering a valid code in the memory of a receiver means is shown and discussed in U.S. Pat. No. 29,525 and U.S. Pat. No. 4,750,118, the teachings of which are incorporated herein by reference.

If the input code matches valid system protocol, the valid code detector circuit 60 disables the random code generator 56. Thus, pushing the program switch 54 initially turns on the random code generator 56. However, when an appropriate signal is received by antenna 64, the random code generator is turned off.

In the activation mode in which the program switch 50 is not depressed, the transceiver 24 is used to activate equipment such as the garage door opener 30. The user enters the activation mode by depressing a transmit switch, such as the code 1 transmit switch 50. The transmit switches control the memory address decoder 68 so that when the code 1 transmit switch 50 is pressed, the memory address decoder 68 accesses the location in non-volatile code memory 66 where code 1 has been stored. As set forth above, code 1 would have been previously stored during either learning mode or programming mode operation. Depressing the transmit switch 70 will access other memory address storing the second code. While only two transmit switches are shown, it will be appreciated that additional such switches can be used to cause creation and storage of additional codes, and to transmit signals carrying those codes.

The code stored at the appropriate location in the non-volatile code memory 66 is passed to an encoder/modulator 78. Provided that a transmit switch has been depressed, an enable signal is sent from the memory address decoder 66 to the encoder/modulator 78, powering up the encoder/modulator. The encoder/modulator transforms the code stored in non-volatile code memory 66 into a binary serial data code stream. This serial output is then used to modulate an RF oscillator 80. The modulated signal from the RF oscillator 80 is transmitted to the remote receiver 28, FIG. 4, via an antenna 82.

Figure 3:
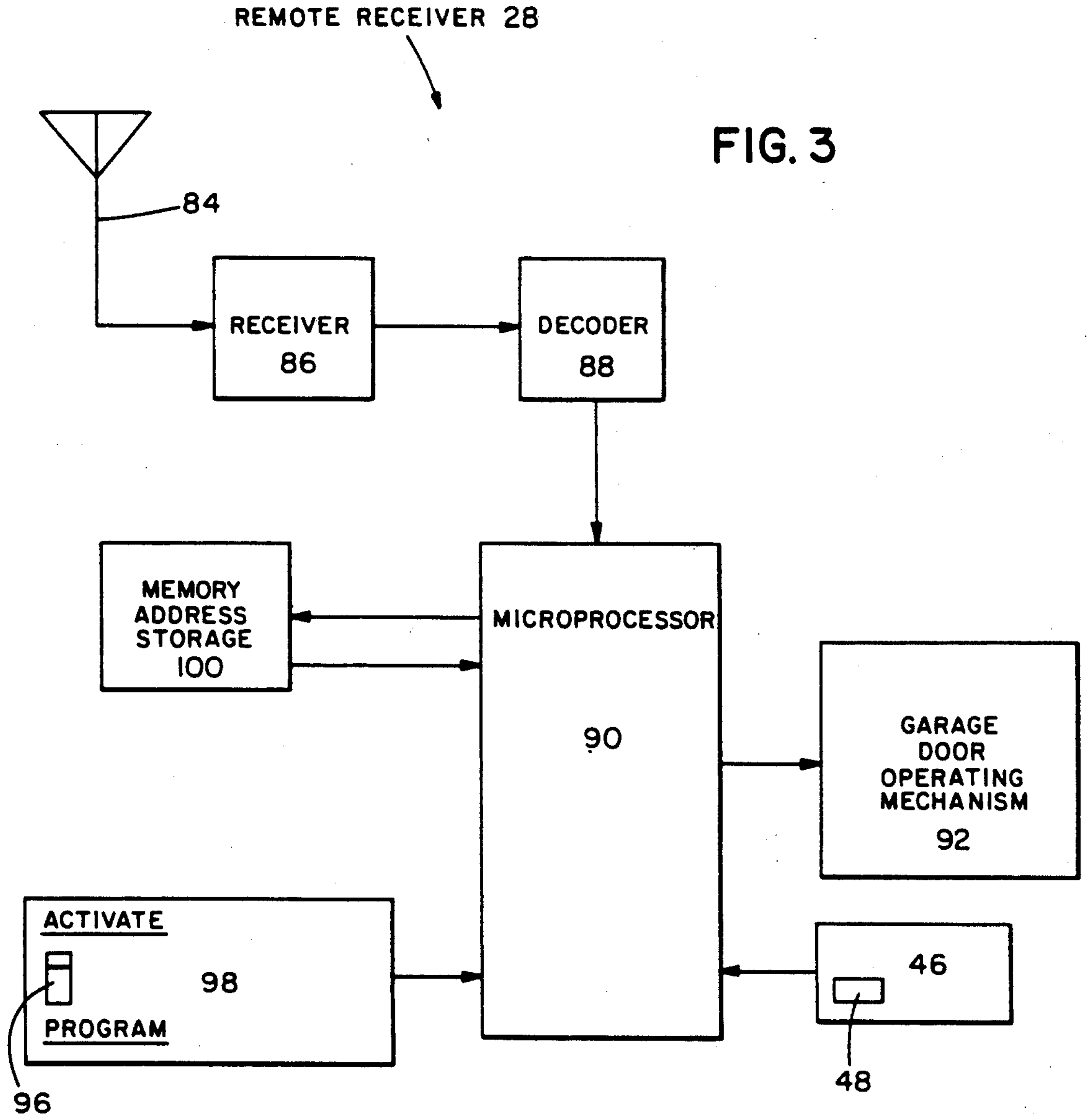
FIG. 3 is a block diagram showing electrical and electronic components of a receiver used in the system of FIG. 1.

Referring to FIG. 3, the remote receiver unit 28 in the garage door opener head unit 34 includes a receiver 86 which has a suitable antenna 84 for receiving radio frequency transmissions from the transceivers 24 and 26. The received signal is supplied to a decoder 88 which provides an output to a microprocessor 90. The microprocessor 90 is connected to a garage door operating mechanism 92. The garage door operating mechanism includes a motor which drives the chain 94, FIG. 1, to move the door 32 in a conventional manner. The auxiliary control unit 46 is also connected to the microprocessor 90. A switch 96 is mounted on a switch unit 98, FIG. 1, connected to the head unit 34 and also to the microprocessor 90. The switch 96 may be a two-position switch that can be moved between the activate and program positions to establish the "activate" mode and the "program" mode. For further information concerning the structure and operation of such a receiver unit 28, see U.S. Pat. No. 4,750,118.

When the garage door operator 30, FIG. 1, is initially installed, the switch 96 is moved to the program mode and one of the transmit switches 24, 26 of one of the transceivers 24, 26 is depressed so that the first code is transmitted. The switch 96 is preferably a momentary push-button switch that is biased to its "activate" position. Momentary movement of the switch 96 to its "program" position places the circuit in a program mode for approximately 30 seconds or until a valid code is received, whichever occurs first. The transmitted signal is received by the receiver 86, decoded by the decoder 88 and supplied to the microprocessor 90. The first code will be supplied to a memory address storage 100 connected to microprocessor 90. Then the switch 96 is moved to the activate mode. If either first signal transmit switch 24, 26 is depressed, the microprocessor 90 will compare the received code with the code stored in the address storage memory 100. If the stored code coincides with the transmitted code, the microprocessor 90 will energize the garage door operating mechanism 92 to open or close the door.

It will be appreciated that another remote receiver unit, similar to 28 except programmed to store the second code, can be used for controlling another system, such as a security system or a lighting system. Thus the transceivers 24 and 26 can be used to establish multiple random codes. They permit copying of the codes and storage of the codes in the two or more receivers. Thus, once the transceivers and receivers are programmed to store the randomly established codes, either transceiver can be used to operate the two systems independently. Accordingly, there can be single point control of a multiplicity of receivers controlling separate systems.

As a method of operating a system 20 for establishing a code and controlling operation of equipment, the invention includes several steps:

(1) One of the transceivers 24, 26 is selected and switch means in that transceiver is caused to place in the memory of that transceiver a randomly generated code.

(2) That one transceiver is caused to transmit a radio frequency signal carrying that random code.

(3) Switch means of the other transceiver is caused to place in the memory of that transceiver the random code carried by the signal of the first transceiver.

(4) The random code is caused to be stored in the memory of the remote receiver unit connected to the equipment to be operated.

(5) Either of the transceivers is employed to transmit a signal carrying the random code to cause the receiver to actuate the equipment.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A system for establishing codes and controlling operation of at least two pieces of equipment, such as a garage door operating mechanism and a security device, by transmitting radio frequency signals carrying said codes, said system comprising:

a first transceiver;

a second transceiver substantially identical to said first transceiver, each said transceiver comprising:

means for randomly generating codes, means for receiving a radio frequency signal carrying a code, memory means having a first location for storage of a first code and a second location for storage of a second code, means for selecting one of said locations for storage of a code, means for selecting whether the code is to be stored in the selected location is a code from said means for randomly generating codes or is a code from said means for receiving, the last-mentioned means for selecting including means for disabling said means for randomly generating codes in response to reception of a radio frequency signal carrying a code, and means for transmitting a radio frequency signal carrying the first code and for transmitting a radio frequency signal carrying the second code, said system further comprising:

a first receiver for positioning remote from said transceivers and for connection to one of said pieces of equipment which is a garage door operating mechanism; and a second receiver for positioning remote from said transceivers and for connection to the other of said pieces of equipment, each said receiver comprising:

means for receiving radio frequency signals transmitted by said transceivers, memory means storing the code of only one memory location of said first transceiver, the memory means of the other receiver storing the code of the other memory location of said first transceiver, means for comparing a code carried by a radio frequency signal with the code stored in the last-mentioned memory means, and means responsive to the means for comparing to cause actuation of the corresponding piece of equipment whereby the codes of the memory locations of the transceivers can be identical with either transceiver establishing the codes, either transceiver can actuate either piece of equipment, and in the event of loss of the first transceiver, the second transceiver can be used to program into the memory locations of a third transceiver the codes randomly generated by the first transceiver so that there is no need to change the codes stored in the memories of the receivers.

2. A system as set forth in claim 1 wherein the means for transmitting of each transceiver comprises a radiating antenna, a signal encoder/modulator having an output and an input connected to its memory means, a radio frequency oscillator having an input and an output connected to said antenna, and a transmit switch for selectively causing the output of said modulator to be supplied to the input of said oscillator.

3. A system as set forth in claim 1 wherein the means for receiving of each transceiver comprises a receiving antenna, a signal amplifier and a radio frequency detector interconnected with said antenna and said amplifier.

* * * * *

UNITED STATES PATENT AND TRADEMARK OFFICE
CERTIFICATE OF CORRECTION

PATENT NO. : 4,988,992

DATED : January 29, 1991

INVENTOR(S) : Carl T. Heitschel, et al.

It is certified that error appears in the above-identified patent and that said Letters Patent is hereby corrected as shown below:

Title page: item (57): In the heading entitled, "Abstract", change "siganl" to read the word --signal--.

On the face of the patent, in the heading entitled, "Abstract", change the word "receiver" to read the word --receive--.

In Column 4, line 18, after "Pat." (first occurrence), insert --Re.--.

In Claim 2, Column 6, line 17, delete the word "is".

Signed and Sealed this

Fifteenth Day of September, 1992

*Attest:*

DOUGLAS B. COMER

*Attesting Officer*

*Acting Commissioner of Patents and Trademarks*

UNITED STATES PATENT AND TRADEMARK OFFICE

CERTIFICATE OF CORRECTION

PATENT NO. : 4,988,992

DATED : January 29, 1991

INVENTOR(S) : Carl T. Heitschel, et al.

It is certified that error appears in the above-identified patent and that said Letters Patent is hereby corrected as shown below:

Title page: item [73]: In the heading entitled, "Assignee", change "Conn." to read --Illinois--.

Signed and Sealed this

Ninth Day of November, 1993

Attest:

Bruce Lehman

BRUCE LEHMAN

*Attesting Officer*

*Commissioner of Patents and Trademarks*